Nov. 22, 1966 J. R. LIGENZA 3,287,243
DEPOSITION OF INSULATING FILMS BY CATHODE SPUTTERING
IN AN RF-SUPPORTED DISCHARGE
Filed March 29, 1965
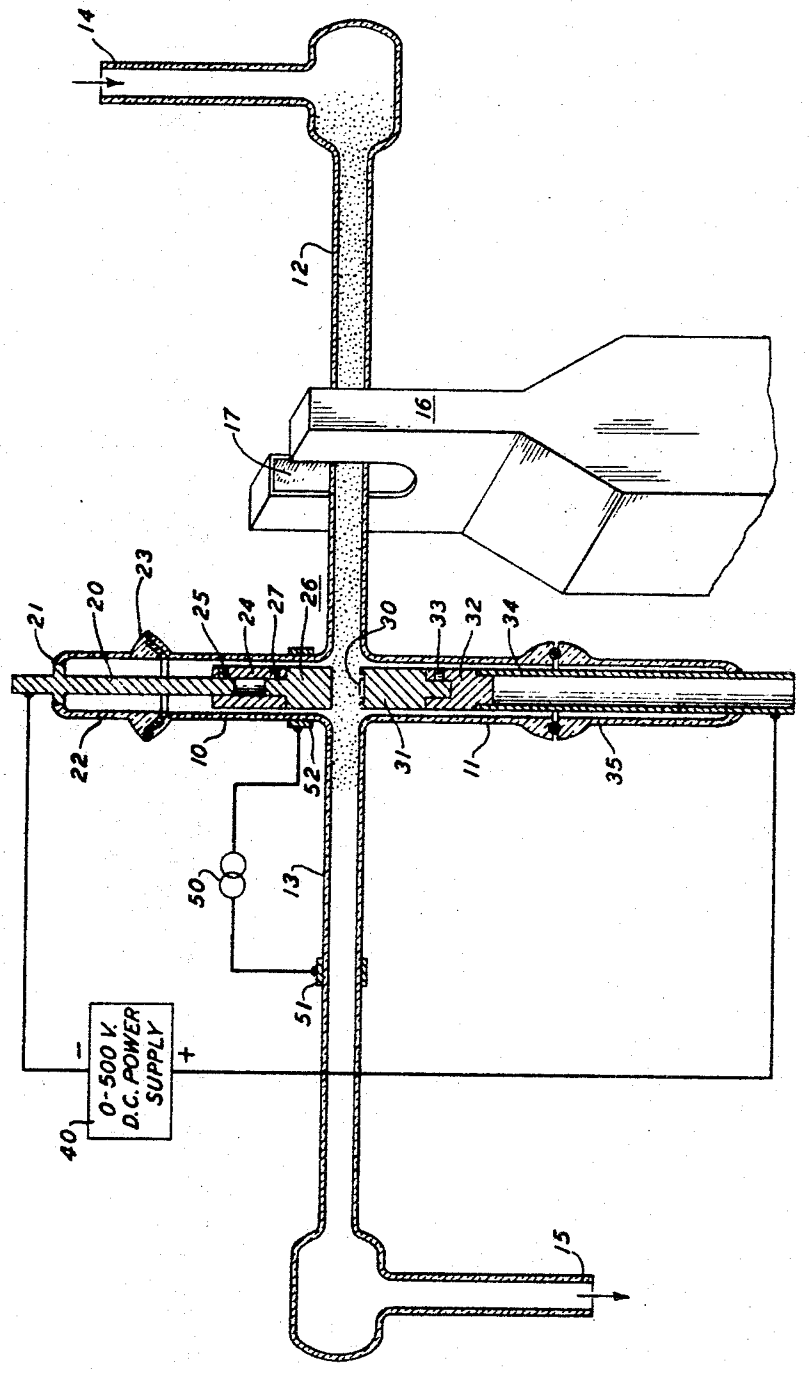
INVENTOR
J. R. LIGENZA
BY [signature]
ATTORNEY United States Patent Office 3,287,243

Patented Nov. 22, 1966

3,287,243

DEPOSITION OF INSULATING FILMS BY CATHODE SPUTTERING IN AN RF-SUPPORTED DISCHARGE

Joseph R. Ligenza, Califon, N.J., assignor to Bell Telephone Laboratories, Incorporated, New York, N.Y., a corporation of New York Filed Mar. 29, 1965, Ser. No. 446,470

9 Claims. (Cl. 204—192)

This is a continuation-in-part of application, Serial No. 358,473, filed April 9, 1964, now abandoned, which relates to a method for depositing insulating or protective films on semiconductor substrates.

The obtaining of a protective film on a semiconductor surface finds various commercial uses particularly in the processing of electrical semiconductor devices such as diodes and transistors. In the fabrication of these devices oxide films are used for masking portions of the semiconductor to obtain selective diffusion and are also employed as passivating layers for protecting the surface of the device against contamination and leakage currents. Oxide films are employed in many thin-film devices.

The conventional method for obtaining a desired oxide layer on a semiconductor body is by growing the oxide as a result of thermally induced oxidation of the semiconductor surface. This practice has long been recognized as inconvenient in the processing of electrical devices especially in forming the passivating layer. This is because the electrical characteristics of the otherwise completed device suffer harmful effects due to the extreme temperatures required to oxidize the semiconductor surface. Furthermore, the growth of oxide passivating films requires that a part of the semiconductor body, to the extent of the depth of the passivating layer, be reserved during processing for subsequent conversion to form the oxide. This creates severe problems in fabricating thin-film devices where thickness tolerances and diffusion depths are very critical.

These and other difficulties are in whole or part overcome by the use of the method of this invention. According to the invention an insulating film appropriate for the uses mentioned above is deposited on the surface of a semiconductor substrate under specially selected conditions with the aid of a moderate density plasma supported by an external microwave field. In this manner oxide films or nitride films can be produced depending upon the composition of the plasma gas.

These and other aspects of the invention will be more easily understood with the aid of the following detailed description. In the drawing:

The figure is a front elevation, partly in section and partly schematic, of an apparatus appropriate for the practice of this invention.

The apparatus of the figure consists basically of a quartz tube constructed in four sections or arms as shown. The two vertical sections 10 and 11 support the electrodes while the horizontal section 12 contains the plasma. Section 13 and section 12 provide means for establishing the gas in the plasma region at the desired composition and pressure. The reactive gas is admitted at 14. The terminal portion 15 of the section 13 communicates with a vacuum system for establishing the desired pressure, generally a moderate vacuum of the order of a fraction to several millimeters. The tube diameter of the sections 12 and 13 is not critical. The tube used in the procedures described here was 1 cm. I.D.

The plasma generated in the section 12 is supported by an external microwave field which is coupled to the tube by a tapered waveguide 16. The width of the slot 17 of the waveguide corresponds approximately to the outside tube diameter. The requirements of the microwave field will vary significantly with the specific arrangement of the apparatus, in particular, the relative dimensions. The power source used with the apparatus described here is a 2450 mc. Raytheon Model PGM–100CW capable of generating 300 to 1000 watts of microwave power. The frequency and power level can be varied depending upon the requirements of the plasma as specifically defined in the subsequent description.

The electrode assemblies are constructed of materials which will withstand the operating conditions and will not contaminate the system. The cathode comprises a silicon support rod 20 which is sealed into the closed end 21 of the terminal tube section 22. The tube section 22 is joined to the arm 10 by a 35/25 ball and socket joint 23. The rod 20 is secured within an aluminum sleeve 24 by set screw 25. The cathode 26 is held in the lower end of the sleeve 24 by set screw 27. The cathode block 26 is easily interchanged to provide the appropriate source metal for the cation of the film desired. In particular, silicon, aluminum and beryllium cathode materials provide effective results.

The anode assembly is also made so as to be easily disassembled. This permits ready access to the substrate 30. The anode assembly comprises an anode block 31 composed of aluminum seated into a copper support block 32 by set screw 33. A copper sleeve 34 is brazed to support block 32. The sleeve 34 is sealed within a removable tube section 35. The removable tube section is joined to the section 11 with a standard No. 25 Pyrex O-ring joint. The anode and cathode are connected to a D.C. power source schematically at 40 which delivers 0 to 500 volts at 0 to 300 milliamperes.

The apparatus is completed by an RF generator shown schematically at 50 which creates an RF field across the surface of the cathode 26. Gold leaf rings 51 and 52, placed as indicated, provide the desired field. The position of the electrodes is not critical as long as the field is generated at the cathode surface.

An essential aspect of the invention is the use of the medium density plasma which provides a region of highly reactive ions between the source material 26 and the substrate 30. As atoms are sputtered under the influence of the D.C. potential from the cathode, they combine with gas species probably at or near the cathode-plasma interface, and deposit on the substrate surface. It has been found that if the substrate surface is itself maintained under a condition of intense high energy bombardment through contact with the plasma, the ions being deposited at the substrate surface retain sufficient activation energy to migrate to a position of low free energy. This surface migration, after deposition, permits the film to deposit uniformly without an interfacial discontinuity.

It has been found desirable to support the plasma externally of the reaction zone by using a microwave signal discharging through a portion of the reactive gas atmosphere. Under the conditions described here the plasma will form along a substantial portion of the tube, the extent of which is readily evident to the eye. The extent of the plasma in a typical case is indicated in the figure.

For a full understanding of the invention the nature of the plasma and its function in the transfer mechanism will be explained.

A plasma is a gas which contains an equal number of positive and negative charges. An ideal plasma is commonly thought of as being composed wholly of electrons and positively, singly charged ions. It is also required that the gas be totally ionized. Plasmas realized in practice are only partially ionized and often contain some negative ions. Some of the positive ions bear more than a single charge and as a rule the positive and negative charges are not exactly equal. A plasma generated by microwave, RF or D.C. power is not self-sustaining; energy must be fed into the plasma to maintain it. Energy is lost from a plasma by emission of radiation and by the recombination of positive and negative charges. At low pressures in the range 0.1 to 10 mm. the charge recombination reaction takes place exclusively on any wall available to the plasma. This occurs since a third body must be present to carry away the energy of the recombination (three body) reaction and at these pressures, three body collisions are extremely rare. Electrons always have a much larger mobility than does any ion. Consequently, in low pressure discharges, electrons outrace positive ions to any wall and therefore the wall is always negatively charged with respect to the plasma. The plasma does not possess an exactly equal number of positive and negative charges for this reason. The greater the concentration of electrons (plasma density) and the greater the electron mobility (electron temperature) the larger the "wall potential." The larger the wall potential the greater the energy to which ions will be accelerated to the wall for neutralization. Consequently for a surface to receive intense ion bombardment it need not be made a "real cathode" with a battery. It can receive the same intense ionic bombardment if it is immersed in a dense plasma where it will become a "virtual cathode" because of the large wall potential.

However, to extract metal atoms from the source material it is necessary to impose a D.C. potential between the source cathode and the substrate. This potential combined with the wall potential serves to attract the plasma ions to the cathode surface. Consequently, to effectively utilize the wall potential to aid in establishing a saturation density of plasma ions, the cathode is also maintained in direct contact with the plasma. When the applied potential exceeds approximately 25 volts the cathode region will be saturated with gas ion species. Any voltage above 25 volts will not draw more than the saturation positive ion current density.

The rate at which atoms will be ejected from the cathode will be proportional to the product of the sputtering yield times the current density times the area of the cathode. The sputtering yield increases with increasing voltage. As the voltage impressed on the positive ions increases, the depth of penetration of ions into the cathode will also increase. The sputtering yield is the ratio of atoms ejected per ion incidence. For the purposes of this invention this ratio should never exceed unity. The cathode current density should be maintained in the range 25 to 35 milliamperes per $cm.^2$.

The selection of the proper D.C. potential is important to the success of the invention. Below 125 volts, ion penetration into the solid is superficial and sputtering is very slight. Above 125 volts sparks will form all over the cathode surface. These sparks are tiny nonself sustaining arcs and are accompanied by momentary large current surges and the ejection of molten globules of silicon. These globules deposit on the substrate and interfere with the deposition. The mechanism for the formation of the arcs is believed to be the following. At the higher voltages the ion penetration is deeper into the solid. Since the sputtering yield is less than unity there will be film formation over the entire cathode surface. This film forms an insulating barrier and when the film becomes thick enough, the plasma ions arriving at the film surface will not be discharged as rapidly as they arrive. Consequently an ion layer will be formed on the cathode. The presence of this positive charge layer does two things: (1) it will set up a field across the film, and (2) this field will slow down oncoming positive ions from the plasma and thus reduce the sputtering rate. The magnitude of the field is directly proportional to the surface concentration of the positive ions. When the field exceeds the dielectric breakdown strength of the insulating film a small arc will form. The accumulated charge rushes into the breakdown region and expands its energy rapidly, locally heating the film and underlying silicon to the melting point and in this manner causes the violent ejection of molten material. These arcs appear, at random, in positions over the entire cathode surface (which is immersed in the gas plasma). The arcs increase in violence and frequency of occurrence as the voltage is advanced above 125 volts.

Thus the sputtering of the cathode material into the reactive plasma region for subsequent deposit on the substrate as a film does not proceed as might be expected, but is defeated by the ejection of minute masses of the source material. The substrate soon evidences a disorganized deposit interspersed with globules of source material which make the film ineffective for the desired purposes.

The appreciation of the mechanism which is responsible for the ineffective deposit and its elimination form another basis for this invention. Upon the elimination of the troublesome charge layer the deposit proceeds in the desired manner and films of unusual uniformity and quality are obtained.

The charge layer is eliminated by periodically interrupting the cathode potential to bring the cathode to the wall potential and neutralize the charge layer.

In this manner effective sputtering potentials in the range 125 volts to 500 volts can be realized. Such a periodic interruption in the cathode potential is most conveniently achieved by means of a radio frequency oscillator. The cathode is made a simultaneous RF electrode. Consider the RF voltage on the cathode alone, without a simultaneous D.C. voltage. On the negative half cycle the electrode will be negative with respect to the plasma at a potential sinusoidally varying with time, plus the wall potential. As the RF voltage passes to the positive half cycle the RF electrode can assume only the negative wall potential with respect to the plasma. Thus on the negative half cycle positive plasma ions (such as $O_2^+$ and $N_2^+$) ions are accelerated to the cathode surface. These ions may accumulate on the cathode surface, but before they can build up on sufficient density to cause dielectric breakdown, the RF voltage has passed to the positive half cycle and the ions become neutralized by the plasma electrons. The applied D.C. voltage must be smaller in magnitude than the peak RF voltage so that there will always be a part of a cycle where plasma electrons will arrive at the cathode. Thus in this manner one can sputter the cathode in a dense gas plasma at any voltage above 125 volts, to obtain very large sputtering rates, without incurring any sparking. The minimum frequency effective for this purpose is approximately 50,000 cycles/sec.

The requirements of the plasma for effective operation according to the principles of this invention can be characterized in terms of its saturation current density for a given gas pressure range. The gas pressures found to be most useful lie in the range 0.1 mm. to 10 mm. The saturation current density is a parameter known in the art and described by Johnson and Malter in Physical Review 80, 58 (1950). The preferred range of this parameter is in the range 0.1 $ma./cm.^2$ to 100 $ma./cm.^2$. If the saturation current density falls below this range the deposition proceeds very slowly. At saturation current densities in excess of this range the substrate overheats.

The following examples using the apparatus of the figure illustrate the procedure of this invention.

*Example I*

Silicon oxide (vitreous $SiO_2$) was deposited on a silicon substrate 30. The cathode block 26 was composed of silicon. The substrate 30 was silicon.

Oxygen gas was admitted through the gas manifold 14 into the tube sections 12 and 13 at a pressure of approximately 1 mm. of Hg. The plasma was generated in the oxygen atmosphere by a 2450 mc. generator. The power dissipation was 400 watts. The neutral gas temperature was approximately 450° C. and the plasma density was approximately $10^{13}$ electrons/cm.$^3$. The voltage supplied at 40 was 350 volts and the positive ion current density was 0.030 amps/cm.$^2$. The RF oscillator 50 delivered 500 volts at a frequency of 27 mc. During the deposition the plasma enveloped both the anode and cathode. The interelectrode distance was approximately 1.7 cm. The electrode separation is critical for two reasons. Each electrode must contact the plasma, and the spacing is preferably within 0.5 cm. to 5 cm. The silicon cathode is sputtered at the equivalent rate of about 2000 A. of $SiO_2$ per minute. Some of the sputtered material is lost by deposition onto the adjacent walls of the tube. The final deposition rate at the anode is about 300 A. of $SiO_2$ per minute. At the same time the anode is receiving an oxygen ion bombardment of .030 amps/cm.$^2$ which corresponds to an ion arrival rate at the electrode surface of $2 \cdot 10^{17}$ ions/cm.$^2$/sec. and since the average surface density of a solid is of the order of $10^{15}$ atoms/cm.$^2$, these operating conditions result in an ion bombardment of 200 mono-layers of ions per second. The 300 A./min. $SiO_2$ deposition rate corresponds to 1.5 monolayers of $SiO_2$/sec. In this example a vitreous silica film having a uniform thickness of 10,000 A. and exceptional quality was deposited in the substrate. Substrate materials other than silicon, such as germanium, tantalum and aluminum are equally effective. The sole requirement of the substrate is that it be stable and nonvolatile at the reaction conditions.

*Example II*

In this example, silicon nitride films were produced. Nitride films are especially attractive in certain cases where the substrate is more stable in the nitrogen plasma than in a similarly formed oxygen plasma. This is peculiar of germanium, cadmium sulfide and gallium arsenide substrates, for instance.

The operating conditions were the following:

| | |
|---|---|
| Atmosphere | 250–300 microns of nitrogen. |
| Microwave power | 300 watts. |
| RF power | 2000 volts; 200 ma. |
| D.C. power | 320 volts; 95 ma. |
| Substrate temperature | 25° C. to 300° C. |
| Deposition rate | 175 A./min. |

The silicon nitride films were deposited on silicon substrates and germanium substrates. $Si_3N_4$ films deposited on germanium substrates could be stripped from the substrate. These films were examined by electron diffraction and $\alpha$-$Si_3N_4$ was identified.

For the passivation experiments, three diode wafers were coated with 6000 A. of silicon nitride; all three exhibited n-type inversion-layer characteristics and conductivities (charge density $\approx 2 \times 10^{11}$ chgs./cm.$^2$). Upon removal of the films no bulk damage to the silicon was observed.

This film also masks against phosphorus diffusions and it presents no etching or photoresist problems. It is a hard dense film and is dissolved by dilute hydrofluoric acid solutions.

*Example III*

The same conditions described in Example II were used to deposit silicon nitride films onto gallium arsenide and cadmium sulfide substrates. Since gallium arsenide tends to form a troublesome vapor, care must be taken to avoid excessive heating of the substrate from any excess microwave energy present. This simply requires that the waveguide be placed so as not to couple too closely with the region adjacent the gallium arsenide substrate. The films obtained were similar to those of Example II. Other substrate materials such as tantalum, quartz and glass can be used in a similar manner.

*Example IV*

Using an aluminum cathode source (99.9999% purity) aluminum nitride films, having wurtzite structures, were deposited on gallium arsenide substrates.

*Example V*

To illustrate the versatility of the procedure of this invention, further runs were made using different materials. The operating conditions were the same as those described in Example I. Using cathodes composed of beryllium and aluminum, high quality beryllium oxide, beryllium nitride and aluminum oxide films can be formed on substrates such as gold, aluminum, tantalum, silicon, germanium, III–V semiconductor materials such as GaAs, GaP, and II–VI semiconductors such as CdS and on quartz, BeO and glass. In every case the films can be formed at temperatures well below the melting point of the substrate material. Carbide films are formed in cases where the plasma gas is methane. The fact that the basic procedure of the invention can be applied directly to a variety of materials illustrates the unusual versatility of the process.

Various other modifications and extensions of this invention will become apparent to those skilled in the art. All such variations and deviations which basically rely on the teachings through which this invention has advanced the art are properly considered within the spirit and scope of this invention.

What is claimed is:

1. A method for depositing an insulating film on a solid substrate which comprises the steps of contacting an anode substrate and a cathode body composed of a material selected from the group consisting of silicon, beryllium and aluminum, said anode and cathode spaced at a distance of 0.5 cm. to 5 cm. with a moderate density gas plasma, said plasma characterized by a gas pressure of 0.1 mm. to 10 mm. said gas selected from the group consisting of oxygen, nitrogen and methane, and further characterized by a positive ion saturation current density in the range 0.1 to 100 ma./cm.$^2$, impressing a D.C. voltage of at least 125 volts between said anode and cathode and applying an RF signal with a frequency in excess of 50 kc. and a voltage in excess of said D.C. voltage to the interface between the cathode and the plasma so as to permit continued uniform deposition of the insulating film on the substrate.

2. The method of claim 1 wherein the gas is oxygen.

3. The method of claim 1 wherein the gas is nitrogen.

4. The method of claim 1 wherein the gas is methane.

5. The method of claim 1 in which the anode substrate is a material which is stable and nonvolatile under the reaction conditions.

6. The method of claim 1 in which the anode substrate comprises silicon.

7. The method of claim 3 wherein the substrate is gallium arsenide.

8. The method of claim 3 wherein the substrate is germanium.

9. The method of claim 3 wherein the substrate is cadmium sulfide.

References Cited by the Examiner

UNITED STATES PATENTS

| | | | |
|---|---|---|---|
| 3,021,271 | 2/1962 | Wehner | 204—192 |
| 3,108,900 | 10/1963 | Papp | 117—93.1 |

JOHN H. MACK, *Primary Examiner.*

R. MIHALEK, *Assistant Examiner.*